United States Patent
Narula et al.

(10) Patent No.: US 12,538,142 B2
(45) Date of Patent: Jan. 27, 2026

(54) AUTO-CONFIGURATION OF DENSE INFORMATION HANDLING SYSTEM MESH NETWORKS

(71) Applicant: Dell Products, L.P., Round Rock, TX (US)

(72) Inventors: Harpreet Narula, Austin, TX (US); Nicholas Wanner, Austin, TX (US); Arnold Thomas Schnell, Hutto, TX (US)

(73) Assignee: Dell Products, L.P., Round Rock, TX (US)

( * ) Notice: Subject to any disclaimer, the term of this patent is extended or adjusted under 35 U.S.C. 154(b) by 378 days.

(21) Appl. No.: 18/354,103

(22) Filed: Jul. 18, 2023

(65) Prior Publication Data

US 2025/0031064 A1    Jan. 23, 2025

(51) Int. Cl.
*G01R 31/08* (2020.01)
*H04W 8/00* (2009.01)
*H04W 24/02* (2009.01)
*H04W 52/36* (2009.01)

(52) U.S. Cl.
CPC .......... *H04W 24/02* (2013.01); *H04W 8/005* (2013.01); *H04W 52/367* (2013.01)

(58) Field of Classification Search
CPC ... H04W 24/02; H04W 8/005; H04W 52/367; H04L 47/10; H04L 43/50; H04L 12/2697; H04L 43/0852; H04L 43/00
See application file for complete search history.

(56) References Cited

U.S. PATENT DOCUMENTS

| | | | | |
|---|---|---|---|---|
| 10,855,799 B2* | 12/2020 | Quinn | ................. | H04L 41/0823 |
| 11,979,397 B2* | 5/2024 | Hamlin | ............... | H04L 63/0853 |
| 2018/0232031 A1* | 8/2018 | Swierk | .................... | H04L 43/20 |

* cited by examiner

*Primary Examiner* — Phuongchau Ba Nguyen
(74) *Attorney, Agent, or Firm* — Fogarty LLP

(57) ABSTRACT

In auto-configuration of dense mesh networks an Information Handling System (IHS) runs an advertisement service when the IHS is powered on and transmits a wireless local area network beacon information element that includes wireless node IHS specific information. The IHS dynamically scales transmit power of advertisement packets, from a low power. In response to the IHS finding a cluster host, the IHS accepts configuration of the IHS with an identification for a cluster of the cluster host and a frequency channel within the cluster. In response to the IHS not finding a cluster host, the IHS identifies as a new (cluster) host IHS and defines an identification for the new cluster. The cluster identification may be a Basic Secure Set (BSS) color field of the information element. Defining the identification for a cluster may use a distributed cluster policy, or may use a centralized managed cluster policy.

20 Claims, 7 Drawing Sheets

AUTO-CONFIGURATION OF DENSE INFORMATION HANDLING SYSTEM MESH NETWORKS

FIELD

This disclosure relates generally to Information Handling Systems (IHSs), and, more specifically, to auto-configuration of dense Information Handling System (IHS) mesh networks.

BACKGROUND

As the value and use of information continues to increase, individuals and businesses seek additional ways to process and store information. One option available to users is information handling systems. An Information Handling System (IHS) generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

"Hoteling" is a method of office management in which workers dynamically schedule their use of workspaces such as desks, cubicles, and offices, as well resources associated therewith such as (an) IHS monitor(s), keyboard, mouse, webcam, etc., particularly where a hybrid, partial remote and partial in-office, work model is employed by an enterprise. Such hybrid office workspaces may make use of wireless IHS docking stations ("dock") and portable IHSs (e.g., laptops) wirelessly linked thereto. Each wireless dock results in an additional Wireless Local Area Network (WLAN) link which is in addition to the WLAN link from Access Points (APs) in the enterprise environment. A sample hybrid office space may have, by way of example, 230 seats within wireless range. High bandwidth needs for video data over a WLAN link, typically require a 160 MHz link. Thus, a maximum of twelve non-overlapping channels may be available in this hybrid office space example, assuming complete bandwidth is available. Still the number of concurrent channels needed is much higher for typical hybrid workspace seating. One typical solution is to reduce the transmit (Tx) power of the radio on both sides of the link. However, limited controls are available in typical IHS operating systems. Additionally applying such Tx power limits also limit device connectivity with infrastructure and challenges the signal-to-noise ratio (SNR) of the signal in such a high-interference environment.

SUMMARY

Embodiments of auto-configuration (automatic configuration) of dense Information Handling System (IHS) mesh networks are described. In an illustrative, non-limiting example an IHS runs an advertisement service when the IHS is powered on and transmits a wireless local area network beacon information element comprising wireless node IHS specific information. The IHS dynamically scales transmit power of advertisement service advertisement packets, from a low power. In response to the IHS finding a cluster host, the IHS accepts configuration of the IHS, by the cluster host, with a unique identification for a cluster of the cluster host and a unique frequency channel within the cluster of the cluster host. In response to the IHS not finding a cluster host, the IHS identifies as a new (cluster) host IHS and defines a unique identification for the new cluster.

The advertisement service may run continuously, or may be configured to time out. The wireless node IHS specific information may include a class of the IHS and/or a state of a wireless node configuration of the IHS. The state of the wireless node configuration of the IHS, the unique identification for the cluster of the cluster host and the unique identification for the new cluster may be a Basic Secure Set (BSS) color field of the information element.

In response to the IHS not finding a cluster host, the IHS may increase the transmit power of advertisement service advertisement packets. Then, in response to the transmit power being increased to a maximum level and the IHS not finding a cluster host, the IHS may use a distributed cluster policy to define the unique identification for the new cluster by detecting a cluster identification configuration for each cluster it finds and selecting a different cluster identification as the unique identification for the new cluster. Alternatively, under a centralized managed cluster policy, in response to the IHS finding a group cluster host, the IHS may request that the group cluster host assign the IHS the unique identification for the new cluster, and configure, the IHS with the unique identification for the new cluster. However, in response to the transmit power being increased to a maximum level and the IHS not finding a group cluster host, the IHS may identify as a new group cluster host IHS and define a unique identification for the new cluster.

In some implementations, a wireless node IHS may be centrally located with respect to the cluster and assigned as a group cluster host. Alternatively, or additionally, configuring the information element in the wireless local area network beacon, identifying the wireless node IHS as a new cluster host IHS and/or defining the unique identification for the new cluster are carried out via telemetry information. Also, in some implementations the telemetry information may be used to trigger reconfiguration of the cluster host and/or group cluster host.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, in accordance with embodiments of the present systems and methods, an IHS may be a personal computer (e.g., laptop), tablet computer, mobile device (e.g., personal digital assistant (PDA) or smart phone), a wireless docking station, conference room equipment, such as, by way of example video bar, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, touchscreen and/or a video display. The IHS may also include one or more buses operable to transmit communications between the various hardware components. A more detailed example of an IHS is described with respect to FIG. 1.

Figure 1:
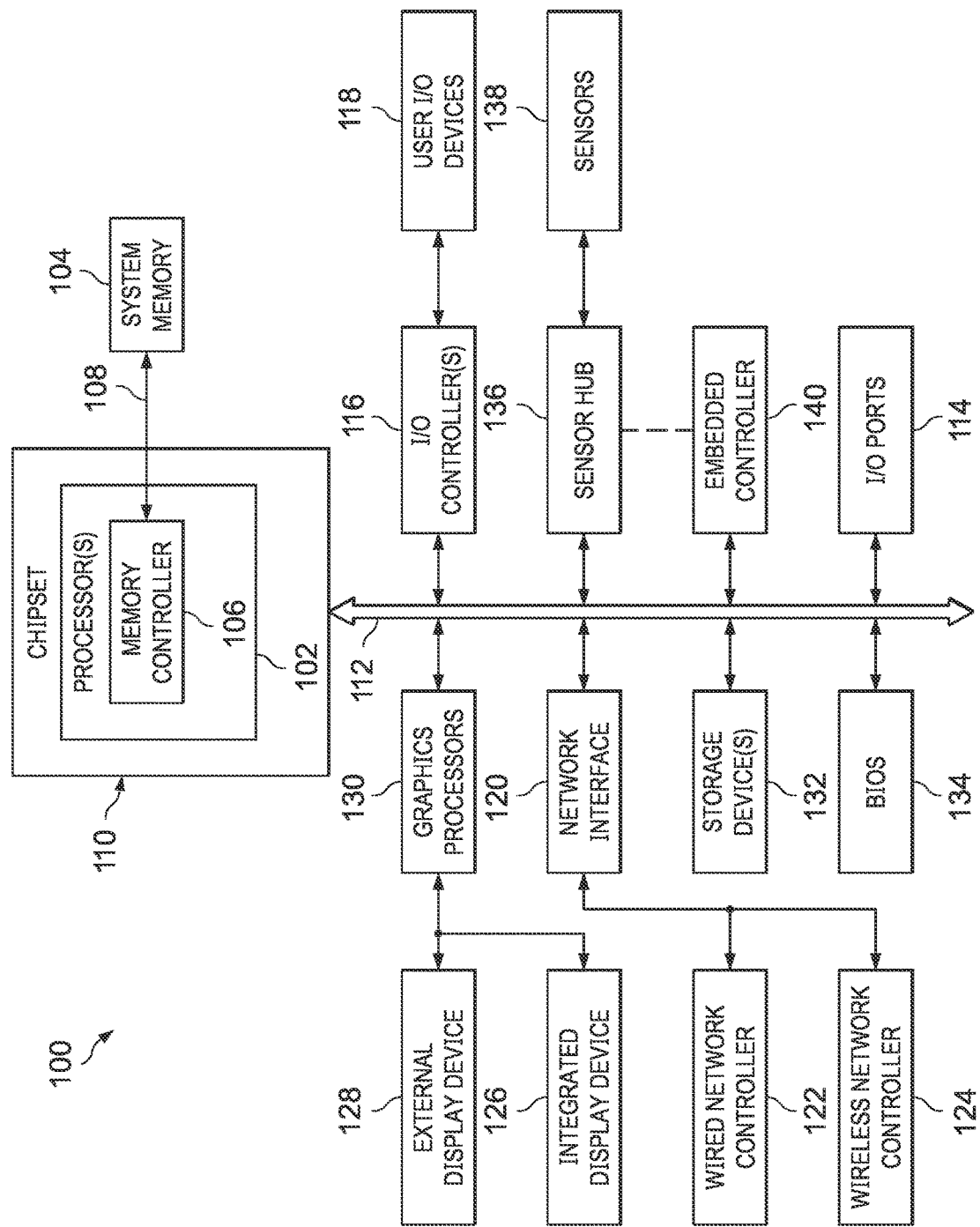
FIG. 1 is a block diagram illustrating components of an example of an Information Handling System (IHS), according to some embodiments.

FIG. 1 is a block diagram of an example of internal components of IHS 100, configured for auto-configuration in dense IHS mesh networks, according to some embodiments. As shown, IHS 100 includes one or more processors 102, such as a Central Processing Unit (CPU), that execute code retrieved from system memory 104. Although IHS 100 is illustrated with a single processor 102, other embodiments may include two or more processors, that may each be configured identically, or to provide specialized processing operations. Processor(s) 102 may include any processor capable of executing instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 1, processor(s) 102 includes memory controller 106 that may be implemented directly within the circuitry of processor(s) 102, or memory controller 106 may be a separate integrated circuit that is located on the same die as processor(s) 102. Memory controller 106 may be configured to manage the transfer of data to and from the system memory 104 of IHS 100 via high-speed memory interface 108. System memory 104 coupled to processor(s) 102 provides processor(s) 102 with a high-speed memory that may be used in the execution of computer program instructions by processor(s) 102. Accordingly, system memory 104 may include memory components, such as static RAM (SRAM), dynamic RAM (DRAM), NAND Flash memory, suitable for supporting high-speed memory operations by processor(s) 102. In certain embodiments, system memory 104 may combine both persistent, non-volatile memory and volatile memory. In certain embodiments, system memory 104 may include multiple removable memory modules.

IHS 100 utilizes chipset 110 that may include one or more integrated circuits that are connected to processor(s) 102. In the embodiment of FIG. 1, processor(s) 102 is depicted as a component of chipset 110. In other embodiments, all of chipset 110, or portions of chipset 110 may be implemented directly within the integrated circuitry of processor(s) 102. Chipset 110 provides processor(s) 102 with access to a variety of resources accessible via bus 112. In IHS 100, bus 112 is illustrated as a single element. Various embodiments may utilize any number of separate buses to provide the illustrated pathways served by bus 112.

In various embodiments, IHS 100 may include one or more I/O ports 114 that may support removeable couplings with various types of external devices and systems, including removeable couplings with peripheral devices that may be configured for operation by a particular user of IHS 100. For instance, I/O ports 114 may include USB (Universal Serial Bus) ports, by which a variety of external devices may be coupled to IHS 100. In addition to or instead of USB ports, I/O ports 114 may include various types of physical I/O ports that are accessible to a user via the enclosure of IHS 100.

In certain embodiments, chipset 110 may additionally utilize one or more I/O controllers 116 that may each support the operation of hardware components such as user I/O devices 118 that may include peripheral components physically coupled to I/O port 114 and/or peripheral components that are wirelessly coupled to IHS 100 via network interface 120. In various implementations, I/O controller 116 may support the operation of one or more user I/O devices 118 such as a keyboard, mouse, touchpad, touchscreen, microphone, speakers, camera and other input and output devices that may be coupled to IHS 100. User I/O devices 118 may interface with an I/O controller 116 through wired or wireless couplings supported by IHS 100. In some cases, I/O controllers 116 may support configurable operation of supported peripheral devices, such as user I/O devices 118.

As illustrated, a variety of additional resources may be coupled to processor(s) 102 of IHS 100 through chipset 110. For instance, chipset 110 may be coupled to network interface 120 that may support different types of network connectivity. IHS 100 may also include one or more Network Interface Controllers (NICs) 122 and 124, each of which may implement the hardware required for communicating via a specific networking technology, such as BLUETOOTH, in accordance with various embodiments of the present systems and methods, wireless local area network (e.g., Wi-Fi™), Ethernet and mobile cellular networks (e.g., CDMA, TDMA, LTE). Network interface 120 may support network connections by wired network controllers 122 and wireless network controllers 124. Each network controller 122 and 124 may be coupled via various buses to chipset 110 to support different types of network connectivity, such as the network connectivity utilized by IHS 100. Wireless Local Area Networks (WLANs) (e.g., IEEE 802.11ax, 6E Wi-Fi™) may be the subject of embodiments of the present systems and methods for auto-configuration (automatic configuration) of dense IHS mesh networks, and the like. For example, a plurality of laptop IHSs, or the like, may be wirelessly linked via WLANs (e.g., IEEE 802.11ax, 6E Wi-Fi™) with respect to wireless docking station IHSs in a hybrid workspaces office setting in high density ad hoc networks, and embodiments of the present systems and methods may be used to automatically configure (auto-configure) such dense IHS mesh networks.

As illustrated, IHS 100 may support integrated display device 126, such as a display integrated into a terminal, laptop, tablet, 2-in-1 convertible device, or mobile device. IHS 100 may also support use of one or more external displays 128, such as external monitors that may be coupled to IHS 100 via various types of couplings, such as by connecting a cable from the external display 128 to external I/O port 128 of the IHS 100. One or more display devices 126 and/or 128 coupled to IHS 100 may utilize LCD, LED, OLED, or other display technologies. Each display device 126 and 128 may be capable of receiving touch inputs such as via a touch controller that may be an embedded component of display device 126 and/or 128 or graphics processor 130, or it may be a separate component of IHS 100 accessed via bus 112. In some cases, power to graphics processor 130, integrated display device 126 and/or external display 128 may be turned off or configured to operate at minimal power levels in response to IHS 100 entering a low-power state (e.g., standby). Chipset 110 may provide access to one or more display device(s) 126 and/or 128 via graphics processor 130. Graphics processor 130 may be included within a video card, graphics card or within an embedded controller installed within IHS 100. Additionally, or alternatively, graphics processor 130 may be integrated within processor(s) 102, such as a component of a system-on-chip (SoC). Graphics processor 130 may generate display information and provide the generated information to one or more display device(s) 126 and/or 128, coupled to IHS 100.

Chipset 110 also provides processor(s) 102 with access to one or more storage devices 132. In various embodiments, storage device 132 may be integral to IHS 100 or may be external to IHS 100. In certain embodiments, storage device 132 may be accessed via a storage controller that may be an integrated component of the storage device. Storage device 132 may be implemented using any memory technology allowing IHS 100 to store and retrieve data. For instance, storage device 132 may be a magnetic hard disk storage drive or a solid-state storage drive. In certain embodiments, storage device 132 may be a system of storage devices, such as a cloud system or enterprise data management system that is accessible via network interface 120.

As illustrated, IHS 100 also includes Basic Input/Output System (BIOS) 134 that may be stored in a non-volatile memory accessible by chipset 110 via bus 112. Upon powering or restarting IHS 100, processor(s) 102 may utilize BIOS 134 instructions to initialize and test hardware components coupled to the IHS 100. BIOS 134 instructions may also load an OS (e.g., WINDOWS, MACOS, iOS, ANDROID, LINUX, etc.) for use by IHS 100. BIOS 134 provides an abstraction layer that allows the operating system to interface with the hardware components of the IHS 100. The Unified Extensible Firmware Interface (UEFI) was designed as a successor to BIOS. As a result, many IHSs utilize UEFI in addition to or instead of a BIOS. As used herein, BIOS is intended to also encompass UEFI. IHS firmware (UEFI or BIOS), or the like, may enable a user to configure a "boot order." The IHS will try to boot from a first indicated device, and if this fails, the IHS will attempt to boot from the next indicated device, etc.

As illustrated, certain IHS 100 embodiments may utilize sensor hub 136 capable of sampling and/or collecting data from a variety of hardware sensors 138. Sensors may provide access to data describing environmental and operating conditions of IHS 100 (e.g., accelerometers, gyroscopes, hinge sensors, rotation sensors, hall effect sensors, temperature sensors, voltage sensors, current sensors, IR sensors, photosensors, proximity sensors, distance sensors, magnetic sensors, microphones, ultrasonic sensors, etc.). Generally, in various implementations, processor 102 may receive and/or produce context information using sensors 138 including one or more of, for example: a user's presence state (e.g., present, near-field, mid-field, far-field, absent), a facial expression of the user, a direction of the user's gaze, a user's gesture, a user's voice, an IHS location (e.g., based on the location of a wireless access point or Global Positioning System), IHS movement (e.g., from an accelerometer or gyroscopic sensor), lid state (e.g., of a laptop), hinge angle (e.g., in degrees), IHS posture (e.g., laptop, tablet, book, tent, and display), whether the IHS is coupled to a dock or docking station, a distance between the user and at least one of: the IHS, the keyboard, or a display coupled to the IHS, a type of keyboard (e.g., a physical keyboard integrated into IHS 100, a physical keyboard external to IHS 100, or an on-screen keyboard), whether the user operating the keyboard is typing with one or two hands (e.g., holding a stylus, or the like), a time of day, software application(s) under execution in focus for receiving keyboard input, whether IHS 100 is inside or outside of a carrying bag, ambient lighting, a battery charge level, whether IHS 100 is operating from battery power or is plugged into an AC power source (e.g., whether the IHS is operating in AC-only mode, DC-only mode, or AC+DC mode), a power consumption of various components of IHS 100 (e.g., CPU 102, GPU 130, system memory 104, etc.), an operating temperature of components of IHS 100, such as CPU temperature, memory module temperature, etc. In certain embodiments, sensor hub 136 may be an independent microcontroller or other logic unit that is coupled to the motherboard of IHS 100. Sensor hub 136 may be a component of an integrated system-on-chip incorporated into processor 102, and it may communicate with chipset 110 via a bus connection such as an Inter-Integrated Circuit (I2C) bus or other suitable type of bus connection. Sensor hub 136 may also utilize an I2C bus for communicating with various sensors supported by IHS 100.

As illustrated, IHS 100 may utilize embedded controller (EC) 140, which may be a motherboard component of IHS 100 and may include one or more logic units. In certain embodiments, EC 140 may operate from a separate power plane from the main processors 102 and thus the OS operations of IHS 100. Firmware instructions utilized by EC 140 may be used to operate a secure execution system that may include operations for providing various core functions of IHS 100, such as power management, management of operating modes in which IHS 100 may be physically configured and support for certain integrated I/O functions. In some embodiments, EC 140 and sensor hub 136 may communicate via an out-of-band signaling pathway or bus 124.

In various embodiments, IHS 100 may not include each of the components shown in FIG. 1. Additionally, or alternatively, IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 102 as an SoC.

Figure 2:
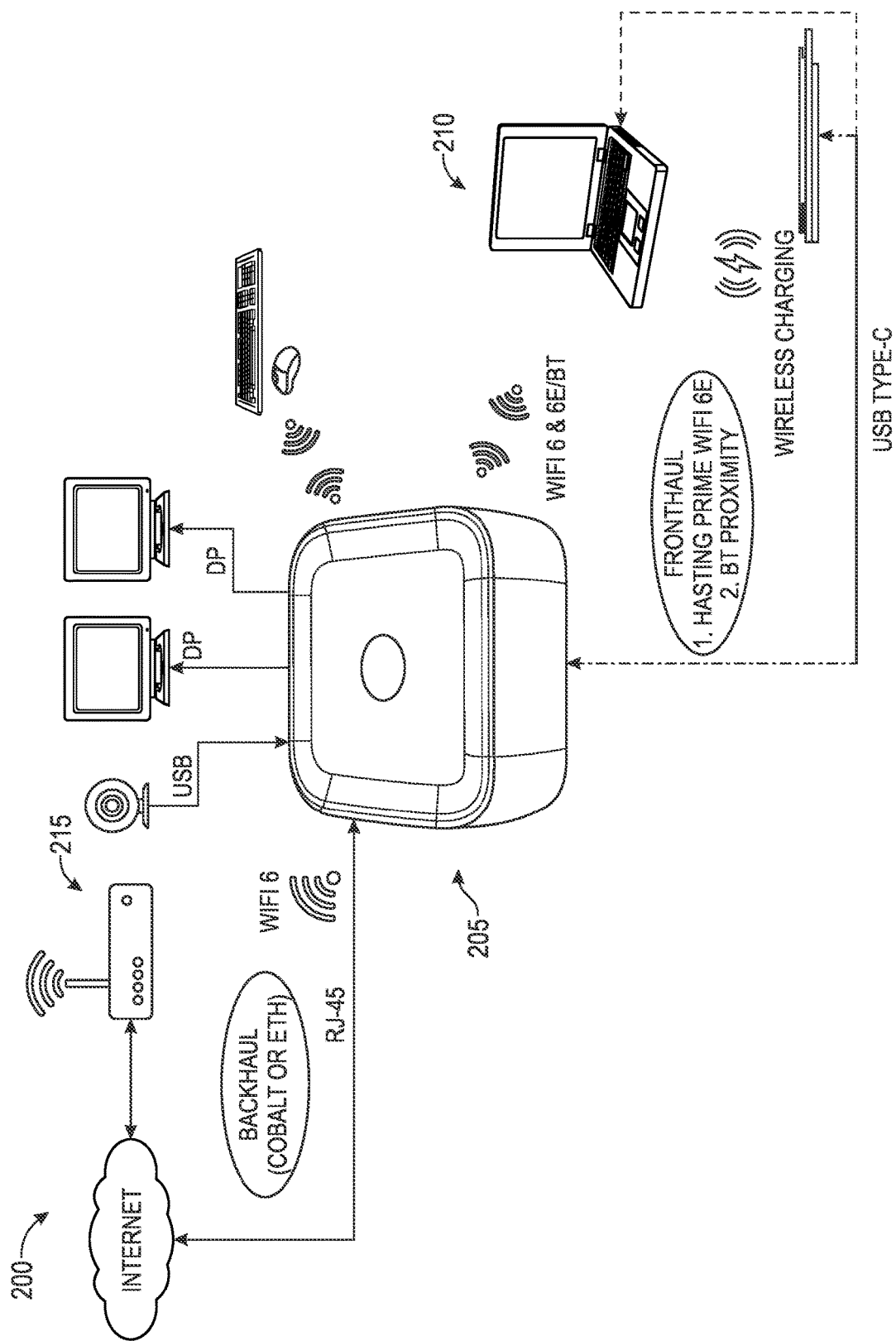
FIG. 2 is a block diagram showing key components of a hybrid workspaces office space, according to some embodiments.

One key enabler of a modern "intelligent" office, (i.e., a hoteling, or hybrid, office workspace) may include wireless docking solutions where, for example, a laptop automatically connects to a wireless docking station ("dock") as the user approaches the dock, a dock-linked external displays lights up and is ready for use when the user (i.e., the laptop) arrives at the dock. FIG. 2 is a block diagram showing key components of such an intelligent hybrid office workspace (200), according to some embodiments. As noted, central to this solution is wireless dock 205 and laptop 210. In various embodiments of such an intelligent hybrid office workspace an ability to accurately measure the relative distance between dock 205 and laptop 210 enables, waking of dock 205 and the dock making connection in such a timeframe, so that dock 205 and connected devices are ready for use when the user (i.e., the laptop) arrives at the dock.

As discussed above, each wireless dock in a hybrid workspaces office setting results in an additional WLAN link, which is in addition to the WLAN link from Access Points (APs) 215 in an enterprise environment employing intelligent hybrid office workspaces 200. A sample office space, such as sample hybrid workspaces office space 300 of FIG. 3, may have, by way of example, as many as 230 seats (reference number(s) 310) within wireless range (e.g., 25 m) (reference number 320) when employing Wi-Fi® 6E. High bandwidth (BW) needs for video data over WLAN link may need a high BW link and may typically need a 160 MHz link, such as may be provided in accordance with Wi-Fi® 6E. In such an example, a maximum of twelve nonoverlapping channels would be available under Wi-Fi® 6E, assuming complete BW is available. Still the number of concurrent channels needed is much higher for typical hybrid office workspaces. See, for example Table 1, below.

TABLE 1

| Seats | 230 |
|---|---|
| Upgraded To Auto Wireless Docking | 50% |
| Auto Wireless Docking Workspaces | 115 |
| Occupancy | 60% |
| Total Users | 69 |

As noted, reducing transmit (Tx) power of the radio on both sides of the link would be a typical approach to a solution. However, only limited controls for TX power are available under a typical operating system. Further, as noted reducing Tx power limits the device connectivity with infrastructure and challenges the signal-to-noise ratio (SNR) of the signal in such a high-interference environment.

Embodiments of the present systems and methods provide solutions for high density WLAN operation through auto-configuration of dense IHS mesh networks. Therein, periodic connectionless bi-directional communication is used for auto-configuration setup of ad hoc mesh network setup into auto-configured clusters. Various embodiments of the present auto-configuration of dense IHS mesh networks may employ protocols for auto-configuration, such as embodiments employing a centrally managed policy for large enterprises, or the like, and embodiments employing a distributed managed policy for small and medium sized businesses, or the like. Embodiments of the present auto-configuration of dense IHS mesh networks enable dynamic configuration of clusters depending on implementation needs, system configuration, available spectrum, etc., which can be reconfigured as more nodes are added or needs change. Embodiments of the present auto-configuration of dense IHS mesh networks may use telemetry, which may be aggregated on the cloud, to monitor and self-trigger a reconfiguration process (of all cluster, or all nodes), or the like. Also, embodiments of the present auto-configuration of dense IHS mesh networks may minimize wireless network traffic collision, through cluster host-to-host communication to intelligently distance similar colored clusters.

Embodiments of the present systems and methods make use of Wi-Fi® 6E capability and WLAN pico-net creation in accordance with embodiments of the present systems and methods, as discussed in greater detail below. Historically, WLANs have (e.g., Wi-Fi® has) operated in the 2.4 GHz and 5 GHz spectrum bands. With standardization of Wi-Fi® 6E, spectrum of 1200 MHz has been added at 6 GHz, resulting in 59 new channels at 20 MHZ, to 6 new channels at 160 MHz, as tabulated in Table 2, below. Ability to combine these channels into wider channels is also supported under IEEE 802.11ax, the Wi-Fi® 6E standard.

TABLE 2

| Band | Number of Channels | BW per Channel |
|---|---|---|
| 2.4 GHz | 3 | 20 MHz |
| 5 GHz | 25 | 20 MHz |
|  | 12 | 40 MHz |
|  | 6 | 80 MHz |
|  | 2 | 160 MHz |
| 6 GHz | 59 | 20 MHz |
|  | 29 | 40 MHz |
|  | 14 | 80 MHz |
|  | 6 | 160 MHz |

Thus, in accordance with the foregoing, 69 or more channels may be needed in a hybrid office workspace, but only twelve channels may be available (or six channels at 160 MHz), even under Wi-Fi® 6E. This need will only increase with continued adoption of hybrid office workspaces, and no new spectrum availability is on the horizon.

Figure 4:
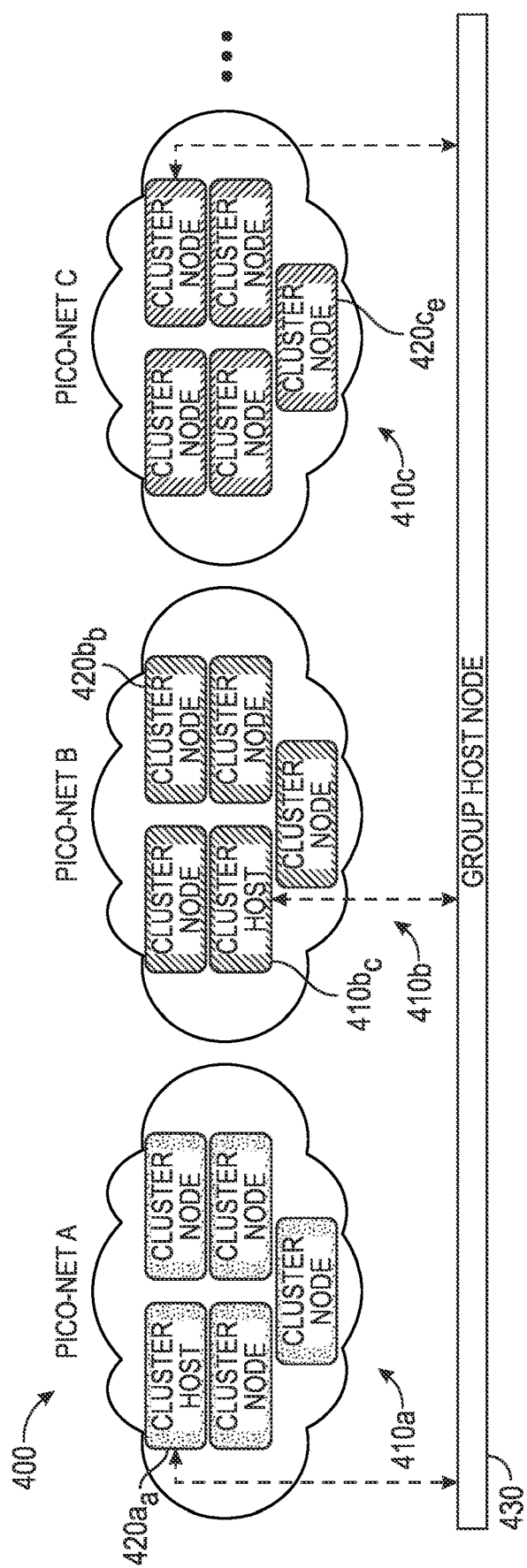
FIG. 4 is a diagrammatic illustration of an example set of Wireless Local Area Network (WLAN) pico-nets, employed according to various embodiments of the present systems and methods.

For an implementation like wireless docks, an additional WLAN is added for each cubicle. Given that a finite number of overlapping channels are available, embodiments of the present systems and methods may "cluster" a set of nearby devices where each device can use a non-overlapping channel. These clusters are referred to herein merely as "clusters," or as "WLAN pico-nets," which are ad-hoc WLAN clusters, under Wi-Fi® 6E. FIG. 4 is a diagrammatic example of such a set (400) of WLAN pico-nets 410a-n (410a-c shown). Devices $420a_a$ though $420n_n$ (e.g., wireless docks (205), IHS laptops (210), routers/APs (215), edge gateways, etc.) within a WLAN pico-net use a unique identification, such as a same Basic Secure Set (BSS) color, as discussed in greater detail below. For example, the WLAN pico-nets are separated from the adjacent WLAN pico-nets by using unique BSS color in the information element in the header of each WLAN packet. BSS color is defined as part of 802.11 networks, such as Wi-Fi® 6E WLANs. Under Wi-Fi® 6(E), BSS coloring enables devices to differentiate transmissions in their own network from transmissions in neighboring networks. However, in accordance with some embodiments of the present systems and methods, a BSS color is a (6-bit) number for a particular WLAN pico-net.

Further, in accordance with embodiments of the present auto-configuration of dense IHS mesh networks, pico-nets clusters 410a-n can be auto-configured with one of the wireless nodes $420a_a$ though $420n_n$ in the pico-net configured as a cluster host node ($420a_a$, and $420b_c$), while the remaining nodes act as client cluster nodes in the respective pico net. These cluster host nodes ($420a_a$, and $420b_c$) can self-manage across respective multiple clusters (420a, and 420b) in a distributed coordination fashion in some embodiments. However, in other embodiments, all the cluster hosts may be centrally coordinated within mesh network 400 using group ("super") host node 430. Both such embodiments of distributed and centrally managed auto-configured dense IHS mesh networks are described herein.

Embodiments of the present auto-configuration of dense IHS mesh networks may, as noted, make use of bi-directional communication and dynamic role assignment to allow for distributed cluster formation with centralized efficient cluster tracking. A primary implementation of embodiments of the present auto-configuration of dense IHS mesh networks may be to setup of ad hoc WLAN P2P nodes into clusters, with frequency diversification within each cluster, which can therefore be adapted for a mesh network with limited spectral resources. Another possible implementation may be in, by way of example, an educational environment example can be EDU setup whereby a Wireless wide area network (WWAN) from a teacher's (laptop) IHS, or the like, can be used to hotspot connectivity to students in a school with multiple similar classrooms. In embodiments of the present auto-configuration of dense IHS mesh networks, the number of nodes in a cluster may be auto-configured based on available frequency spectrum and BW required for the P2P nodes.

Figure 5:
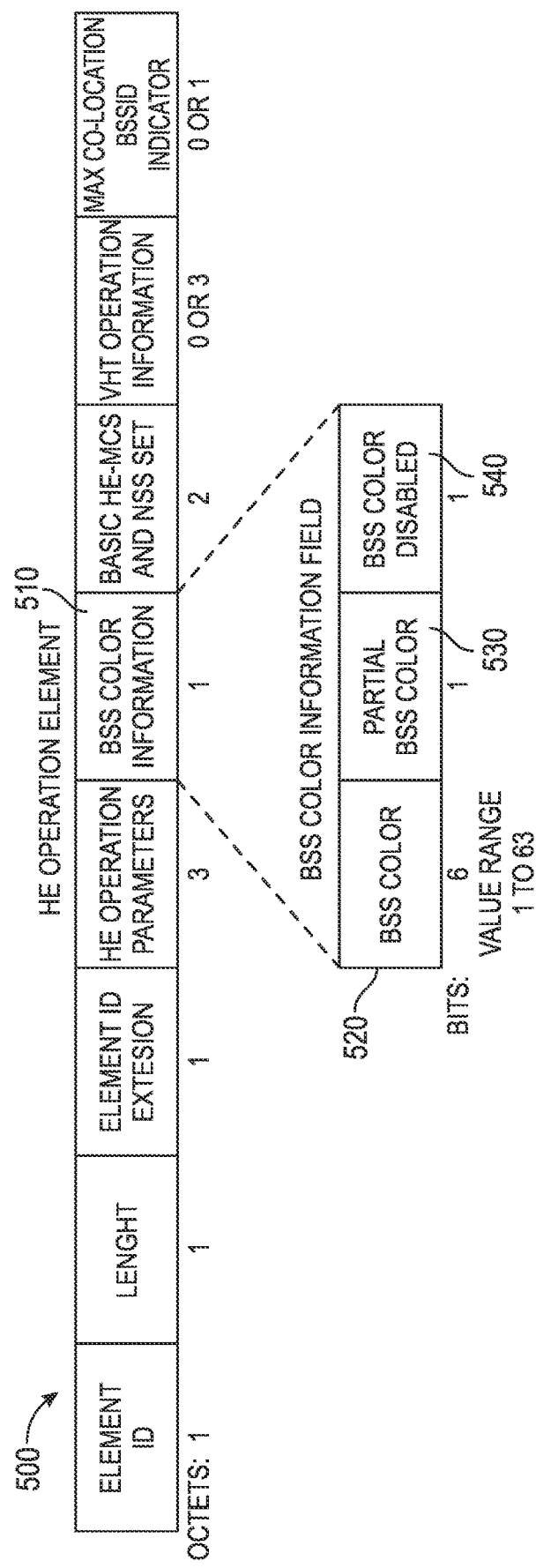
FIG. 5 a diagrammatic illustration of a high efficiency operation element that includes an example Basic Secure Set (BSS) color information field, according to some embodiments.

FIG. 5 is a diagrammatic illustration of high efficiency operation element 500 which can be employed (in-part), by some embodiments of the present systems and methods. High efficiency operation element 500 may be added to frames for peer-to-peer (P2P) or "SoftAP" mode of operation. For example, high efficiency operation element 500 may be added to a beacon frame, a probe response frame a (re)association frame, or the like. Typically, a client device receives one or more of these frames, as part of each packet header, to maintain a WLAN connection. As shown in FIG. 5, high efficiency operation element 500 may, in accordance with embodiments of the present systems and methods, include BSS color information field 510, which may be comprised of BSS color bits (e.g., 6 bits) 520, which may have, by way of example a value range of one to 63, for all 64 pico-nets to be established. BSS color information field 510, may also include partial BSS color 530. This partial BSS color field can be used for extension of BSS color bits 520, by indicating that the 6-bit BSS color bit is partial and additional bits can send part of vendor-specific information in the WLAN Information Element (IE). Bit 540 may indicate whether BSS color is disabled (i.e., not used) (or active) for this packet. Thus, in accordance with embodiments of the present auto-configuration of dense IHS mesh networks, a vendor-defined information element, or the like, may be configured in WLAN beacons, or the like, to include wireless node specific information, such as a class of the IHS (e.g., a wireless dock, a laptop, or the like), a state of a configuration of the device in accordance with the present auto-configuration of dense IHS mesh networks (e.g., a BSS color number, a BSS color being "null" (unassigned until defined in accordance with the present auto-configuration)), or the like.

Figure 6:
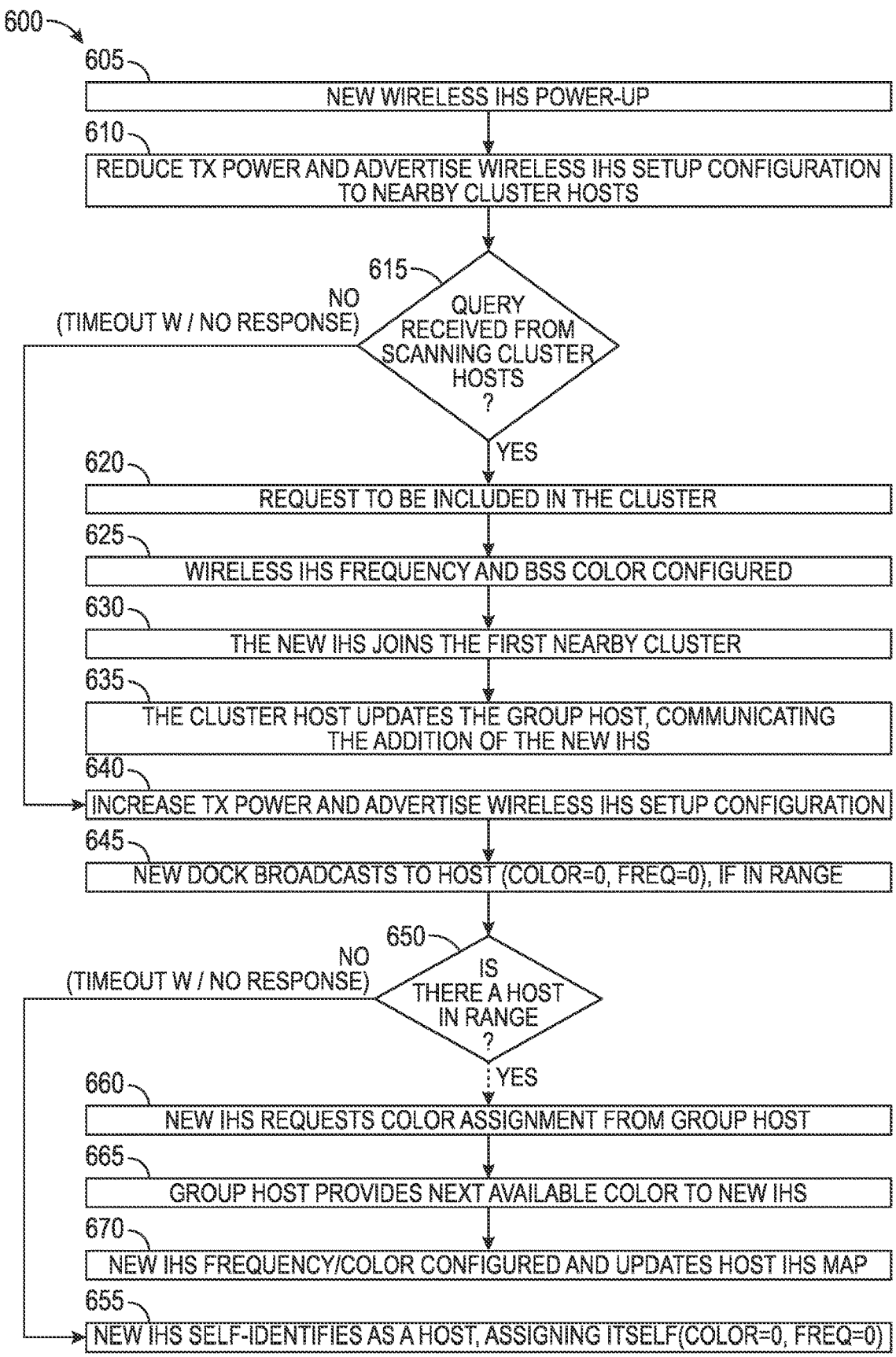
FIG. 6 is a flowchart of an example process for auto-configuration of dense IHS mesh networks, according to some embodiments.

FIG. 6 is a flowchart of example process 600 for auto-configuration of dense IHS mesh networks, according to some embodiments. Therein, upon a new wireless-enabled IHS provisioned in accordance with an embodiment of the present auto-configuration of dense IHS mesh networks powering up (e.g., booting) at 605, this new node IHS will attempt to join a cluster if possible. To such ends, an advertisement service may run on this new wireless node IHS. The advertising service can run continuously or can be configured to time-out, also, the advertisement service may not persist after the new node has been configured, in accordance with embodiments of the present auto-configuration. In accordance therewith, dynamic scaling of Tx power may be employed for the advertisement packets. For example, at 610, the new node IHS may reduce Tx power and advertise its setup configuration to nearby cluster leaders, such as cluster host IHSs ($420a_a$, and $420b_c$). The wireless nodes may start at low power, so they can find a cluster host in close range. A determination may be made at 615, as to whether a query is received from thusly scanning cluster leaders (hosts).

If a cluster host is found in the scan at 615, the cluster host ($420a_a$, and $420b_c$) may configure the new node IHS with a unique (i.e., spectrally non-overlapping, with respect to other nodes in the cluster) frequency channel, at 625, such as after the new node IHS requests to be included in the cluster, at 620. In accordance therewith, the new node may, at 625, inherit (i.e., be assigned) the BSS color, or the like, defined for the found cluster host. Thusly, the new node IHS joins the first nearby cluster at 630. Channel BW may be inherited or configured, such as depending on type and/or needs for the new node in the cluster. At 635, the cluster leader (i.e., the cluster host found at 615) may update other cluster hosts, communicating the addition of the new node IHS.

However, if it is determined at 615 that a cluster host has not been found, for example, if the advertisement at 610 times out without a response, the new node IHS may increase Tx power, incrementally to a maximum level, such as with a timeout delay between each increment, and advertise its setup configuration, at 640. Thereby, the new node IHS broadcasts, by way of example, its BSS color as nul, and frequency as nul, at 645, to any cluster host in range. A determination is then made from this scan, at 650, whether there is a cluster host in range.

If it is determined in the scan at 650 there is no cluster host in (close) range, such as if the advertisement at 640 (and 645) times out without a response, the new node IHS may assume (e.g., self-identify) itself as a cluster host, at 655, such as, by way of example, assigning itself a BSS color and frequency. At 655 a unique identification (ID) (e.g., BSS color) needs to be defined for the resulting new cluster, which can be established, in accordance with embodiments of the present auto-configuration of dense IHS mesh networks using different methods including a distributed cluster policy or a centralized managed cluster policy, which may be used based on an underlying use-case.

In accordance with a distributed cluster policy, distributed cluster formation occurs by the new node IHS detecting the cluster ID configurations (e.g., BSS color) for each cluster in range (e.g., at 645) and selecting a unique (i.e., another) cluster ID (e.g., BSS color) for its own new cluster (e.g., at 655). Thusly, under distributed cluster formation new node IHSs may poll surrounding IHS configurations (e.g., at 645)

and the new node IHS increments configurations until either an available configurations within cluster range is found or until it can become a cluster host (leader). A distributed cataloging methodology can also be implemented to reduce the number of advertisements and/or scan time.

In accordance with a centralized managed cluster policy, centralized managed cluster formation occurs by searching for a group cluster host (430) (e.g., at 640 through 650). Once the group cluster host (430) is found, the centralized managed cluster policy is executed, such as by routing all node requests through the group cluster host. The new node IHS requests, at 660, that the group cluster host assign the new node IHS a unique cluster ID. Once assigned at 665, by the group host providing a next available color to the new node IHS, the new node IHS configures itself and other cluster members with this unique cluster ID, such that the new node IHS frequency and BSS color and a group host cluster host map is updated at 670. In such embodiments, the group host maintains a list of the cluster IDs. Thus, if no Cluster ID is found for the new node IHS at 665, the new node IHS assumes the role as group host. Alternately, Information Technology Decision Makers (ITDMs) may assign (i.e., pre-provision) a suitable node (e.g., a wireless dock, or the like) as group host and locate it at a central location.

In accordance with the foregoing the configuration setup can be collected as telemetry information using (a) telemetry and cloud orchestration (service), which can be used to trigger reconfiguration of the cluster host or group cluster host (and the nodes thereunder).

In furtherance of foregoing process 600, a cluster host service may be implemented on an IHS (wireless dock, laptop, or the like) acting as a cluster host and may be configured differently depending on the configuration of the work area as distributed cluster (e.g., scan and advertise) or a centralized cluster (e.g., scan only). In accordance with various embodiments the cluster host IHS can be configured to periodically auto-configuration scan for devices (e.g., other IHSs) (e.g., IHS transmitting at 610, 620 and 645). The scan rate is configurable based on design and use case. The cluster host is responsible to configure each node in the cluster with spectrally non-overlapping frequencies, along with the configuration of the cluster ID (e.g., BSS color) (e.g., at 625), and other cluster dependent network configuration parameters. Cluster size may be dynamically defined by the available spectrum (e.g., 2.4 GHZ, 5 GHZ, 6 GHZ) and the BW required for the implementation. BW can be scaled depending traffic throughput needs (e.g., based on graphics CODEC defined data throughput needs). Different clusters can have different BW (e.g., an IHS with limited spectrum capability (e.g., 5 GHz only) may be configured with 80 MHz BW. Clusters in different geographies can configure themselves based on the available spectrum while applying local laws, rules and regulations, related to spectrum use.

As noted, the cluster host service may configure the cluster host differently depending on the chosen cluster configuration. For distributed cluster formation, once a cluster host is established (e.g., at 655), a cluster advertisement services starts to advertise the cluster formation and its cluster ID (e.g., BSS color). In this case, the advertisement ADV packet may be limited to a probe and query response similar to continuous WLAN beacons, or the like, with some (e.g., 1 to 2 bytes) of an additional data. Also, for distributed cluster formation auto-configuration scanning continues but may configured to be slower once the cluster size has reached its limit. Once cluster size reaches its limit, cluster hosts can communicate with each other to offload cluster nodes to each other to rebalance the loading. In distributed cluster formation the cluster host handles state locks by querying other nearby cluster hosts for potential state changes (e.g., BW, etc.). For centralized managed cluster formation auto-configuration scanning may stop after the cluster is formed. Synchronization with a group cluster host can be configured (e.g., sync during a specific time window, at a pre-determined frequency, and/or the like).

A group host service may be implemented on an IHS (wireless dock, laptop, or the like) acting as group cluster host used in (a) centralized managed cluster(s) and is responsible to aggregate information of the Cluster formed in the mesh network, assign non-overlapping cluster configuration, and share mesh network related telemetry information. Thereunder, the group host scans for advertisement beacons from cluster hosts. When a new cluster host node is found, the group host configures the cluster host node. The group host prevents state lock, via a centralized catalog. The group host maintains the catalog of all the clusters and nodes within the clusters (e.g., at 670), and may, in various embodiments, be used to re-configure the mesh network with remote management ITDM tools, or the like. The group host may form its own P2P network (e.g., at 655) or may be configured as a stand-alone network management wireless node. The group host may also be configured by an ITDM or a wireless node may assign itself as a group host (e.g., at 655) when no group host can be found in the range (e.g., at 650), as discussed above.

Figure 3:
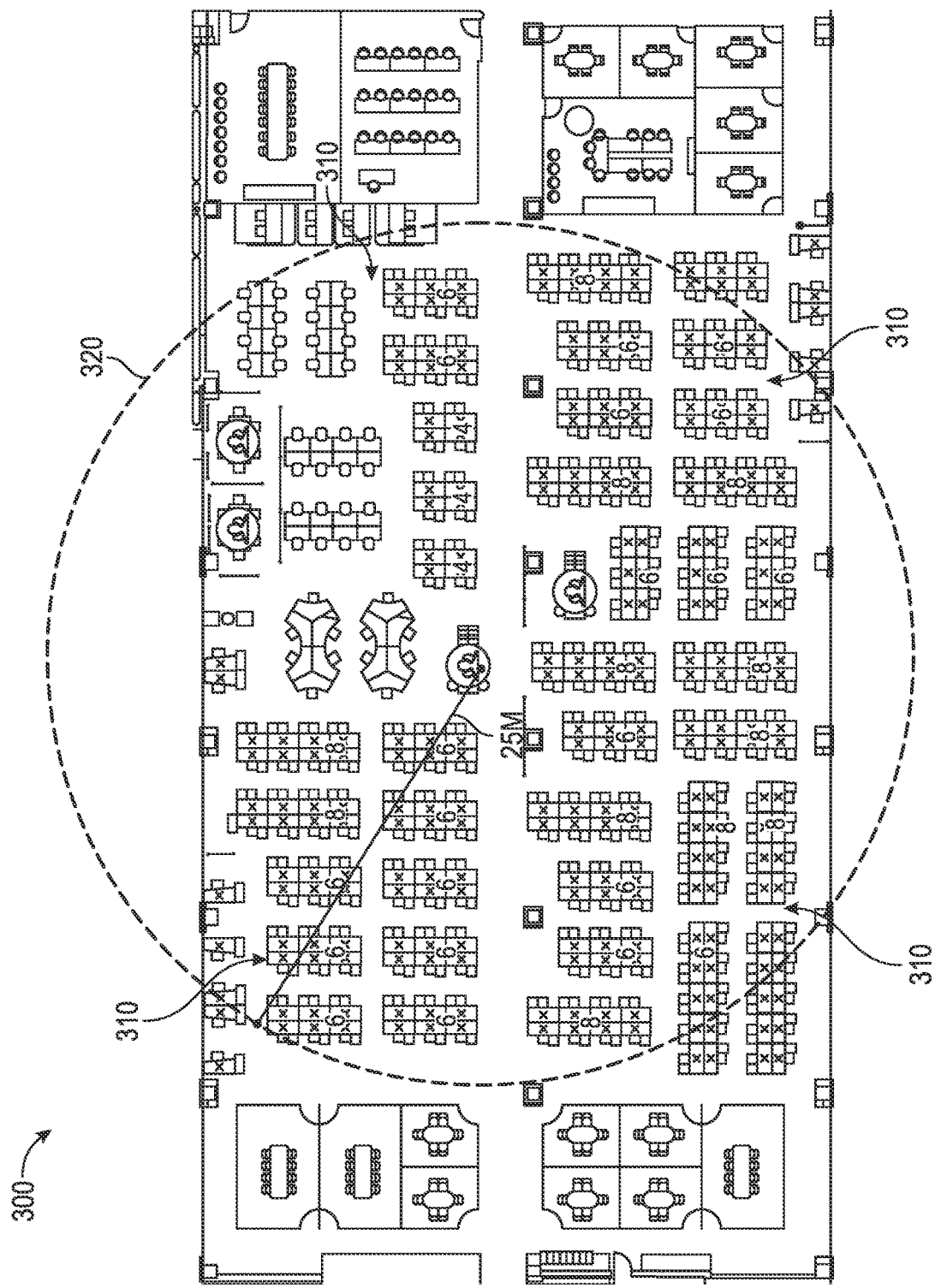
FIG. 3 is a diagrammatic illustration of an example hybrid workspace office space, showing seats within an example wireless local area network range.
Figure 7:
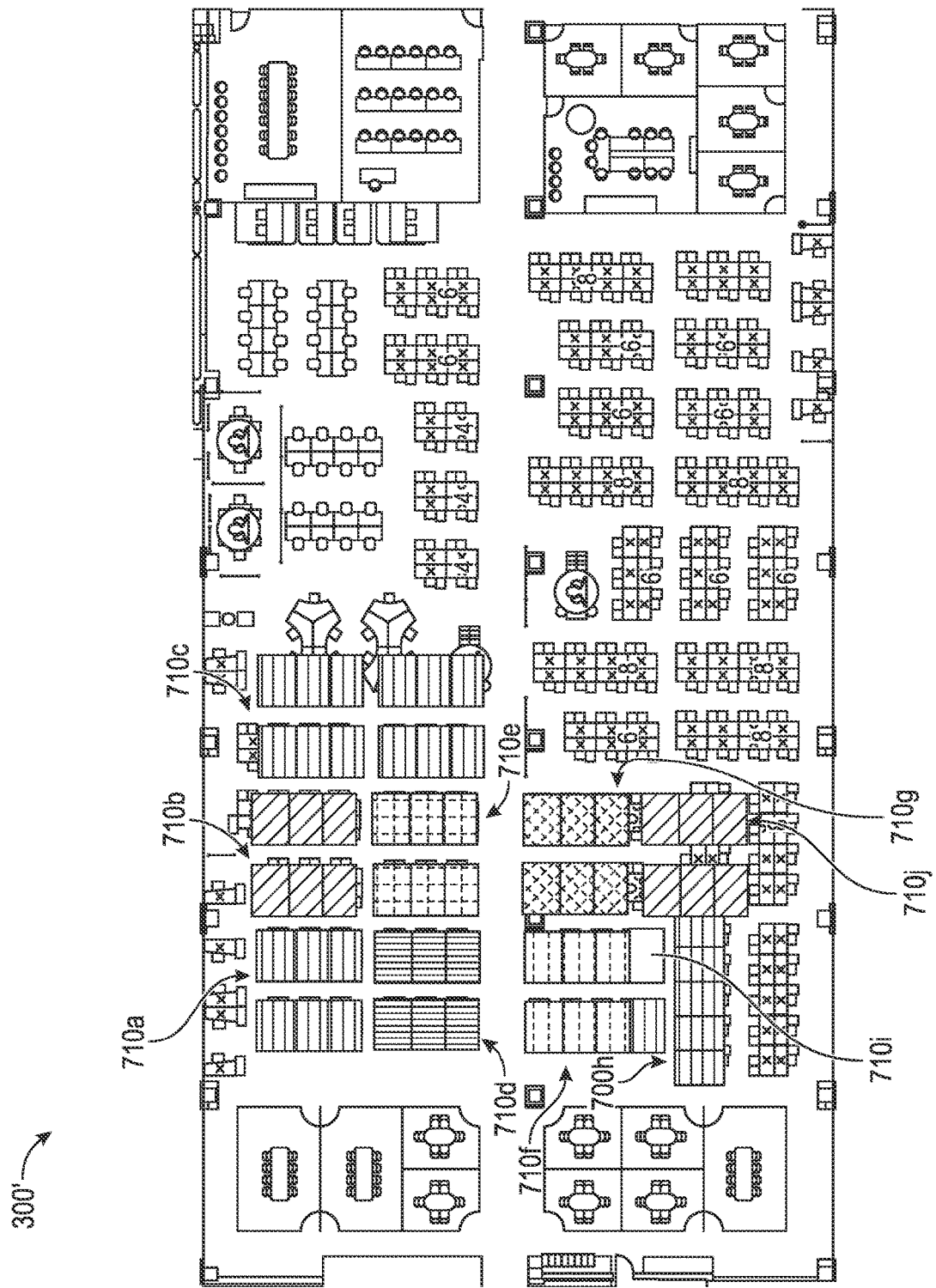
FIG. 7 is a diagrammatic illustration of the example hybrid workspace office space of FIG. 3, showing resultingly auto-configured dense IHS mesh networks, according to some embodiments.

In accordance with the foregoing, FIG. 7 is a diagrammatic illustration of example hybrid workspace office space 300' of FIG. 3, showing resultingly auto-configured dense IHS mesh networks 705a through n (705a through 705j illustrated), according to some embodiments.

In various embodiments, aspects of systems and methods described herein may be implemented, at least in part, using machine learning (ML), such as using artificial intelligence (AI). In an example, when a new node advertises its presence (610, 640), AI can be implemented by recording historic entries and departures of nodes, over time. For example, when a dock (or other IHS) is power cycled while stationary, it should rejoin the same cluster. Docks (or other IHSs) are power cycled when users think the dock (or IHS) is hung, non-responsive, or misconfigured (true or not). Thusly, AI can add stability to the network configuration. Additionally, AI can be used to detect when network traffic from a cluster node is very low or nonexistent, which happens for unpopular hoteling cubes, or the like. Conversely, for popular cubes, or the like, AI can assure those cluster nodes get an unbalanced share of network bandwidth to improve overall experience.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

For example, in various implementations of embodiments of the present systems and methods, an IHS may implement auto-configuration in, and/or, of a dense IHS mesh networks, such as by running an advertisement service when the IHS is powered on, transmitting a wireless local area network beacon information element comprising wireless node IHS specific information and dynamically scaling transmit power of advertisement service advertisement packets from a low power. In response to the IHS finding a cluster host, the IHS may accept configuration of the IHS, from the cluster host, with a unique identification for a cluster of the cluster host and a unique frequency channel within the cluster of the cluster host. However, in response to the IHS not finding a cluster host, the IHS may identify as a new cluster host IHS and define a unique identification for the new cluster.

To implement various operations described herein, computer program code (i.e., instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks. The program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

As noted, in various embodiments, aspects of auto-configuration of dense Information Handling System (IHS) mesh networks described herein may be implemented, at least in part, using ML. As used herein, the terms "machine learning" or "ML" refer to one or more algorithms that implement: a neural network (e.g., artificial neural network, deep neural network, convolutional neural network, recurrent neural network, autoencoders, reinforcement learning, etc.), fuzzy logic, AI, deep learning, deep structured learning hierarchical learning, support vector machine (SVM) (e.g., linear SVM, nonlinear SVM, SVM regression, etc.), decision tree learning (e.g., classification and regression tree or "CART"), Very Fast Decision Tree (VFDT), ensemble methods (e.g., ensemble learning, Random Forests, Bagging and Pasting, Patches and Subspaces, Boosting, Stacking, etc.), dimensionality reduction (e.g., Projection, Manifold Learning, Principal Components Analysis, etc.), or the like.

Non-limiting examples of publicly available machine learning algorithms, software, and libraries that may be utilized within embodiments of systems and methods described herein include, but are not limited to: PYTHON, OPENCV, INCEPTION, THEANO, TORCH, PYTORCH, PYLEARN2, NUMPY, BLOCKS, TENSORFLOW, MXNET, CAFFE, LASAGNE, KERAS, CHAINER, MATLAB Deep Learning, CNTK, MatConvNet (a MATLAB toolbox implementing convolutional neural networks for computer vision applications), DeepLearnToolbox (a Matlab toolbox for Deep Learning from Rasmus Berg Palm), BigDL, Cuda-Convnet (a fast C++/CUDA implementation of convolutional or feed-forward neural networks), Deep Belief Networks, RNNLM, RNNLIB-RNNLIB, matrbm, deeplearning4j, Eblearn.lsh, deepmat, MShadow, Matplotlib, SciPy, CXXNET, Nengo-Nengo, Eblearn, cudamat, Gnumpy, 3-way factored RBM and mcRBM, mPoT, ConvNet, ELEKTRONN, OpenNN, NEURALDESIGNER, Theano Generalized Hebbian Learning, Apache SINGA, Lightnet, and SimpleDNN.

Reference is made herein to "configuring" a device or a device "configured to" perform some operation(s). It should be understood that this may include selecting predefined logic blocks and logically associating them. It may also include programming computer software-based logic of a retrofit control device, wiring discrete hardware components, or a combination of thereof. Such configured devices are physically designed to perform the specified operation(s).

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. A method comprising:
   running an advertisement service on a wireless node Information Handling System (IHS) when the wireless node IHS is powered on;
   configuring an information element in a wireless local area network beacon to include wireless node IHS specific information;
   dynamically scaling transmit power of advertisement service advertisement packets, by the wireless node IHS, from a low power;
   configuring, by a cluster host IHS, in response to the wireless node IHS finding the cluster host IHS, the wireless node IHS with a unique identification for a cluster of the cluster host IHS and a unique frequency channel within the cluster of the cluster host; and
   identifying, by the wireless node IHS, in response to the wireless node IHS not finding the cluster host IHS, the wireless node IHS as a new cluster host IHS and defining a unique identification for the new cluster.

2. The method of claim 1, wherein the advertisement service runs continuously.

3. The method of claim 1, wherein the advertisement service is configured to time out.

4. The method of claim 1, wherein the wireless node IHS specific information comprises one or more of:
   a class of the wireless node IHS; and
   a state of a configuration of the wireless node IHS.

5. The method of claim 4, wherein the state of a configuration of the wireless node IHS, the unique identification for the cluster of the cluster host IHS and the unique identification for the new cluster comprises a Basic Secure Set (BSS) color field of the information element.

6. The method of claim 1, further comprising:
   requesting, by the wireless node IHS, in response to the wireless node IHS finding the cluster host IHS, that the wireless node IHS be included in the cluster of the cluster host IHS; and
   updating, by the cluster host IHS, a group cluster host IHS identifying the wireless node IHS as included in the cluster of the cluster host IHS.

7. The method of claim 1, wherein defining the unique identification for the new cluster further comprises one of:
   using a distributed cluster policy to define the unique identification for the new cluster; and
   using a centralized managed cluster policy to define the unique identification for the new cluster.

8. The method of claim 7, further comprising increasing the transmit power of advertisement service advertisement packets, in response to the wireless node IHS not finding the cluster host IHS.

9. The method of claim 8, wherein defining the unique identification for the new cluster further comprises, in response to the transmit power being increased to a maximum and the wireless node IHS not finding the cluster host IHS, using the distributed cluster policy to define the unique identification for the new cluster, comprising:
   detecting, by the new cluster host IHS, a cluster identification configuration for each cluster it finds; and
   selecting a different cluster identification as the unique identification for the new cluster.

10. The method of claim 8, wherein defining the unique identification for the new cluster using the centralized managed cluster policy to define the unique identification for the new cluster further comprises:
    requesting, by the wireless node IHS, in response to the wireless node IHS finding a group cluster host IHS, the group cluster host IHS to assign the new cluster host IHS the unique identification for the new cluster, and configuring, by the wireless node IHS, the wireless node IHS with the unique identification for the new cluster; and
    identifying, by the wireless node IHS, in response to the transmit power being increased to a maximum level and the wireless node IHS not finding a group cluster host IHS, the wireless node IHS as a new group cluster host IHS and defining a unique identification for the new cluster.

11. The method of claim 10 further comprising assigning the, or another, wireless node IHS centrally located with respect to the cluster as the group cluster host IHS.

12. The method of claim 1, wherein configuring the information element in a wireless local area network beacon, configuring the wireless node IHS, identifying the wireless node IHS as a new cluster host IHS and defining the unique identification for the new cluster is carried out via telemetry information.

13. The method of claim 12, further comprising using the telemetry information to trigger reconfiguration of the cluster host IHS or a group cluster host IHS.

14. An Information Handling System (IHS) comprising:
    at least one processor; and
    a memory coupled to the at least one processor, the memory having program instructions stored thereon that, upon execution by the at least one processor, cause the IHS to:
    run an advertisement service when the IHS is powered on;
    transmit a wireless local area network beacon information element comprising wireless node IHS specific information;
    dynamically scale transmit power of advertisement service advertisement packets by the IHS, from a low power;
    accept configuration, by a cluster host, in response to the IHS finding the cluster host, the IHS with a unique identification for a cluster of the cluster host and a unique frequency channel within the cluster of the cluster host; and
    identify, in response to the IHS not finding the cluster host, the IHS as a new cluster host IHS and defining a unique identification for the new cluster.

15. The IHS of claim 14, wherein the wireless node IHS specific information comprises one or more of:
    a class of the IHS; and
    a state of a wireless node configuration of the IHS.

16. The IHS of claim 15, wherein the state of the wireless node configuration of the IHS, the unique identification for the cluster of the cluster host and the unique identification for the new cluster comprises a Basic Secure Set (BSS) color field of the information element.

17. The IHS of claim 14, wherein, upon execution by the at least one processor, the program instructions further cause the IHS to increase the transmit power of advertisement service advertisement packets, in response to the IHS not finding the cluster host.

18. The IHS of claim 17, wherein, upon execution by the at least one processor, the program instructions further cause the IHS to, in response to the transmit power being increased to a maximum level and the IHS not finding the cluster host, use a distributed cluster policy to define the unique identification for the new cluster, comprising causing the IHS to:
 detect a cluster identification configuration for each cluster it finds; and
 select a different cluster identification as the unique identification for the new cluster.

19. The IHS of claim 17, wherein, upon execution by the at least one processor, the program instructions further cause the IHS to use a centralized managed cluster policy to define the unique identification for the new cluster, comprising causing the IHS to:
 request, in response to the IHS finding a group cluster host, the group cluster host to assign the IHS the unique identification for the new cluster, and configure, the IHS with the unique identification for the new cluster; and
 identify, in response to the transmit power being increased to a maximum level and the IHS not finding a group cluster host, the IHS as a new group cluster host IHS and defining a unique identification for the new cluster.

20. A non-transitory computer readable medium having program instructions stored thereon that, upon execution by an Information Handling System (IHS), causes the IHS to:
 run an advertisement service when the IHS is powered on;
 transmit a wireless local area network beacon information element comprising wireless node IHS specific information;
 dynamically scale transmit power of advertisement service advertisement packets, by the IHS, from a low power;
 accept configuration, by a cluster host, in response to the IHS finding the cluster host, the IHS with a unique identification for a cluster of the cluster host and a unique frequency channel within the cluster of the cluster host; and
 identify, in response to the IHS not finding the cluster host, the IHS as a new cluster host IHS and defining a unique identification for the new cluster.

* * * * *